(12) United States Patent
Kim et al.

(10) Patent No.: US 8,832,740 B2
(45) Date of Patent: Sep. 9, 2014

(54) SIMULATION OF MULTIPLE DVD VIDEO STREAMS IN DVD-VIDEO USER INTERFACES AND RELATED METHOD

(75) Inventors: Jinha Kim, Torrance, CA (US); Leo Rios, Norwalk, CA (US); Jamil Khan Tajik, Playa Del Rey, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1922 days.

(21) Appl. No.: 11/297,112

(22) Filed: Dec. 8, 2005

(65) Prior Publication Data

US 2006/0285821 A1    Dec. 21, 2006

Related U.S. Application Data

(60) Provisional application No. 60/634,650, filed on Dec. 8, 2004.

(51) Int. Cl.

| | |
|---|---|
| G06F 3/00 | (2006.01) |
| G06F 13/00 | (2006.01) |
| H04N 5/445 | (2011.01) |
| H04N 21/488 | (2011.01) |
| H04N 21/482 | (2011.01) |
| H04N 9/82 | (2006.01) |
| H04N 21/431 | (2011.01) |
| H04N 9/804 | (2006.01) |
| H04N 21/432 | (2011.01) |
| H04N 21/426 | (2011.01) |
| H04N 5/85 | (2006.01) |

(52) U.S. Cl.
CPC ......... *H04N 9/8227* (2013.01); *H04N 21/4884* (2013.01); *H04N 5/85* (2013.01); *H04N 21/482* (2013.01); *H04N 21/4316* (2013.01); *H04N 9/8042* (2013.01); *H04N 21/4325* (2013.01); *H04N 21/42646* (2013.01)
USPC .......................................................... 725/40

(58) Field of Classification Search
USPC .................... 386/83; 715/723; 725/41, 40
See application file for complete search history.

(56) References Cited

U.S. PATENT DOCUMENTS

| | | | |
|---|---|---|---|
| 6,305,016 B1 * | 10/2001 | Marshall et al. ................ 725/41 |
| 6,314,575 B1 * | 11/2001 | Billock et al. ................. 725/87 |
| 6,476,873 B1 * | 11/2002 | Maeng .......................... 348/561 |
| 6,806,888 B2 * | 10/2004 | Bhogal et al. ................ 345/660 |
| 7,174,512 B2 * | 2/2007 | Martin et al. ................. 715/719 |
| 2001/0007455 A1 * | 7/2001 | Yoo et al. ...................... 345/856 |
| 2002/0059595 A1 * | 5/2002 | Goldschmidt Iki et al. ..... 725/37 |
| 2005/0075166 A1 * | 4/2005 | Hemstreet et al. ............. 463/30 |
| 2006/0031872 A1 * | 2/2006 | Hsiao et al. .................... 725/28 |
| 2007/0245374 A1 * | 10/2007 | Wu ................................ 725/40 |

* cited by examiner

*Primary Examiner* — Hunter B Lonsberry
*Assistant Examiner* — Christine Kurien
(74) *Attorney, Agent, or Firm* — Jonathan Jaech; Snell & Wilmer L.L.P.

(57) ABSTRACT

A video application that is configured to prompt the display of images on a screen for viewing by a user. The screen includes a display layer that includes a display image having a representation of a sub-stream image. The user can select the representation of a sub-stream image to display a video stream.

20 Claims, 6 Drawing Sheets

SIMULATION OF MULTIPLE DVD VIDEO STREAMS IN DVD-VIDEO USER INTERFACES AND RELATED METHOD

CROSS-REFERENCE TO RELATED APPLICATION

Priority is claimed under 35 U.S.C. §119(e) to U.S. Provisional Patent Application No. 60/634,650, filed on Dec. 8, 2004, entitled "Simulation of Multiple DVD Video Streams in DVD-Video User Interfaces and Related Method," by Jinha Kim, Leo Rios, and Jamil Khan Tajik, which application is incorporated by reference herein.

BACKGROUND OF THE INVENTION

1. Field of the Invention

The invention relates generally to the field of DVD-video streams. More specifically, the invention relates to the simulation of multiple, concurrent, DVD-video streams.

2. Description of the Related Art

DVD-video specifications, written and maintained by the DVD Forum (see http://www.dvdforum.org), set forth the technical capabilities of DVD-video applications, e.g., The Matrix (1999, WHV release). A DVD-video application must conform with these specifications in order for the DVD-video application to play on compliant, DVD-video players. Thus, the DVD-video specifications limit the range of display and interactivity options available for use on compliant, DVD-video players.

One useful component of an engaging and an effective user interface in a DVD-video application is a thumbnail representation of a DVD-video stream ("video stream"), also referred to as a sub-stream image. A thumbnail representation is a small footprint video stream that is usually a repeating-loop excerpt of a full-size, unabridged video stream. In a graphical user interface ("GUI"), e.g., the graphical interface that is displayed on the monitor or television set that is coupled to the DVD player, a thumbnail representation can signify the option of a full video stream that is selectable and viewable by a user. The DVD-video specifications, however, do not contemplate or support the use of thumbnail representations. Accordingly, there is a need for the ability to display thumbnail-like representations of DVD-video streams, while still remaining compliant with the DVD-video specifications.

Another useful component in a DVD-video application is the use of subtitles, also referred to as captions. However, the DVD-video specification does not support the use of subtitles simultaneously with other sub-stream images that are superimposed over a DVD-video stream. Thus, there is a need for the ability to display simultaneously subtitles as well as other sub-stream images on a DVD-video stream.

SUMMARY OF THE INVENTION

The invention is a video application, apparatus, and method that facilitates the display of thumbnail-like representations of video streams, while still remaining compliant with the DVD-video specifications. The video application, apparatus, and method also facilitate the simultaneous display of subtitles as well as other sub-stream images on a DVD-video stream. An exemplary embodiment of the present invention is a video application that is configured to prompt the display of images on a screen for viewing by a user. The screen includes a display layer that includes a display image having a representation of a sub-stream image. The user can select the representation of a sub-stream image to display a video stream.

In other, more detailed features of the invention, the display image includes a moving image stream, which can be a DVD image stream. Also, the user can choose to view a first version of the moving image stream that includes the representation of a sub-stream image or a second version of the moving image without the representation of a sub-stream image.

In other, more detailed features of the invention, the display layer includes a subtitle. Also, the screen can further include a picture-mask layer that is located between the display layer and the user. The picture-mask layer can include a subtitle. In addition, the picture-mask layer can include a button, which includes a subtitle.

In other, more detailed features of the invention, the screen further includes a highlight layer that is located between the picture-mask layer and the user. The highlight layer is configured to define an area that is included in the display layer or the picture-mask layer.

In other, more detailed features of the invention, the picture-mask layer includes a mask image that is configured to cover the representation of a sub-stream image from viewing by the user or to highlight the representation of a sub-stream image for viewing by the user. Also, the user can select whether the mask image covers the representation of a sub-stream image. In addition, the picture-mask layer can further include a background image or more than one background image that can be cycled for viewing by the user.

Another exemplary embodiment of the invention is an apparatus that is configured to display images for viewing by a user. The apparatus includes a display layer and a picture-mask layer that is located between the display layer and the user. The display layer includes a display image having a representation of a sub-stream image. The picture-mask layer includes a mask image that is configured to cover the representation of a sub-stream image. The user selects whether the mask image covers the representation of a sub-stream image. The user can select the representation of a sub-stream image to display a video stream.

An exemplary method according to the invention is a method for displaying images on a screen for viewing by a user. The method includes providing a display layer and displaying a display image from the display layer. The display image includes a representation of a sub-stream image. The user can select the representation of a sub-stream image to display a video stream.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
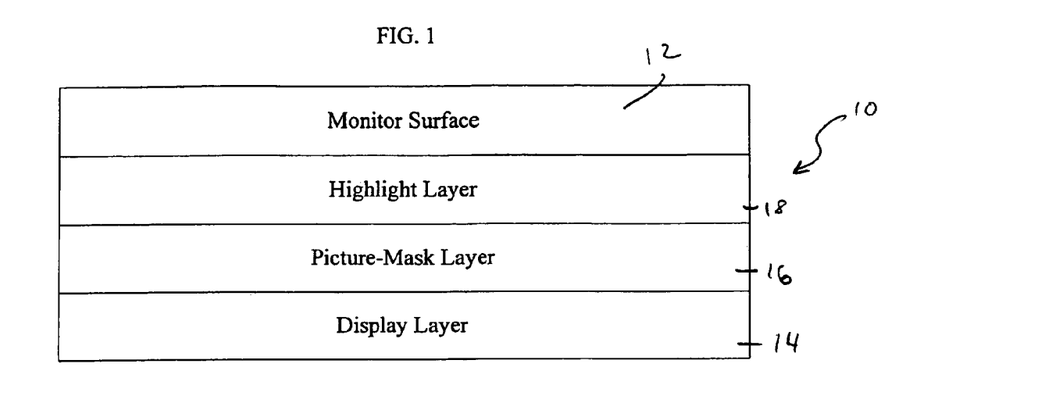
FIG. 1 is a cross-sectional view of a DVD-image on a monitor screen.

FIG. 1 is a cross-sectional, conceptual representation of a DVD-menu screen 10 that is presented on a monitor surface 12 according to one embodiment of the present invention. The menu screen is made up of three composite layers 14-18 that each have a different function. The first layer of the menu screen is the display layer 14, which can include either a still picture (not shown) or a moving-picture, video stream (not shown), and accompanying audio.

The menu screen 10 also includes a picture-mask layer 16, which includes a black-and-white, or up to four color, background image (not shown). The background image is defined by eight bits of data made up of four bits of data for color, and four bits of data for contrast. Conceptually, the picture-mask layer overlays the display layer 14, and thus, can block out images (not shown) in the display layer that lie below the picture-mask layer. Also, it is possible to cycle the picture-mask layer with different background images (not shown) so as present the illusion of animation in the picture-mask layer. The picture-mask layer includes sub-regions (not shown), or sub-pictures (not shown), that can be used to cover or hide portion of the display layer, e.g., simulated thumbnail representations (not shown) that are included in the display layer.

The menu screen 10 also includes a highlight layer 18 that is used to define areas of the menu screen, in the display layer 14 and/or the picture-mask layer 16, that have been selected or activated by the user, or by default. For example, portions of the highlight layer can be used to display an illuminated border (not shown) that surrounds selected images in the display layer and/or the picture-mask layer.

Simulated Multi-Stream DVD Menu

Figure 2:
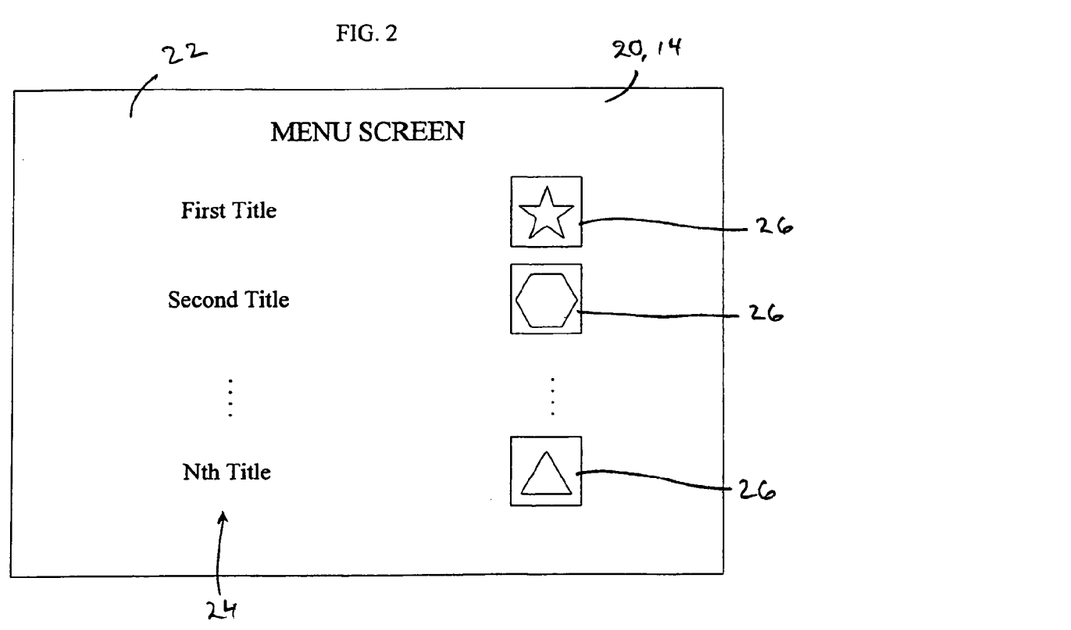
FIG. 2 is an elevational view of a display layer of a DVD-menu screen that includes sub-stream images.

Referring to FIG. 2, one embodiment of the present invention presents a display image 20, e.g., a title menu, that appears to be comprised of a still-image background 22, a list of titles 24, and one or more selectable, thumbnail representations of video-streams 26, associated with each title. However, the thumbnail representations are an illusion achieved by using a single video stream that is included in the display layer 14 of the title menu. While the thumbnail representations are depicted as squares in FIG. 2, the thumbnail representations can be any shape. The single video stream presents a largely unchanging, background image that, because it does not, or largely does not, change, appears to be a still image despite being part of a stream of DVD-video images.

Figure 3:
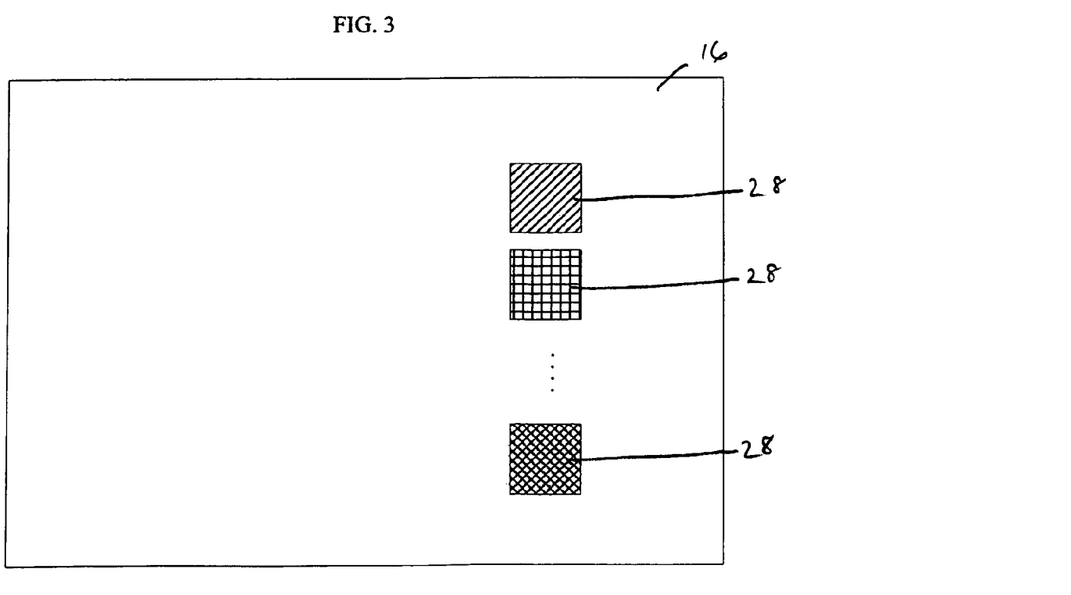
FIG. 3 is an elevational view of a picture-mask layer of a DVD-menu screen that includes mask layers.
Figure 4:
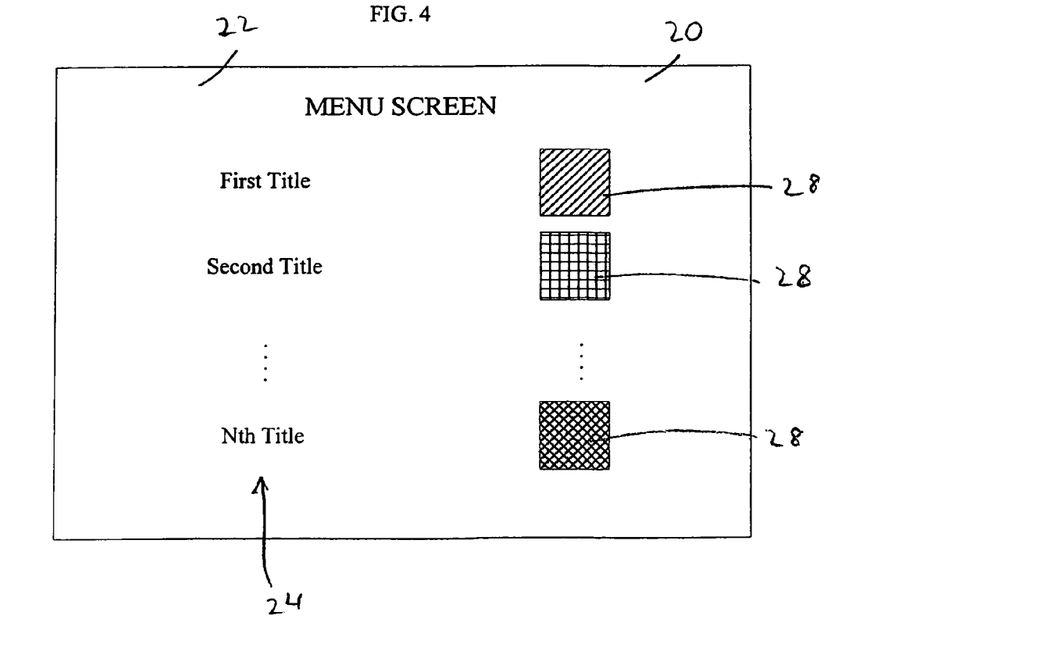
FIG. 4 is an elevational view a DVD-menu screen that includes both the display layer of FIG. 2 and the picture-mask layer of FIG. 3.

The single video stream 20 also includes what appear to be smaller sub-streams 26 of different video images, but these smaller sub-streams are actually part of the single video stream included in the display layer 14. Referring additionally to FIG. 3, the sub-streams are covered, or masked, by mask images 28 included in the picture-mask layer 16 that overlap one or more of the sub-stream images in the display layer. While the mask images are depicted as squares in FIG. 3, the mask images can be any shape. Thus, video images included in the sub-streams are playing below the masked images, but are not visible to the user, i.e., the viewer, as shown in FIG. 4.

Figure 5:
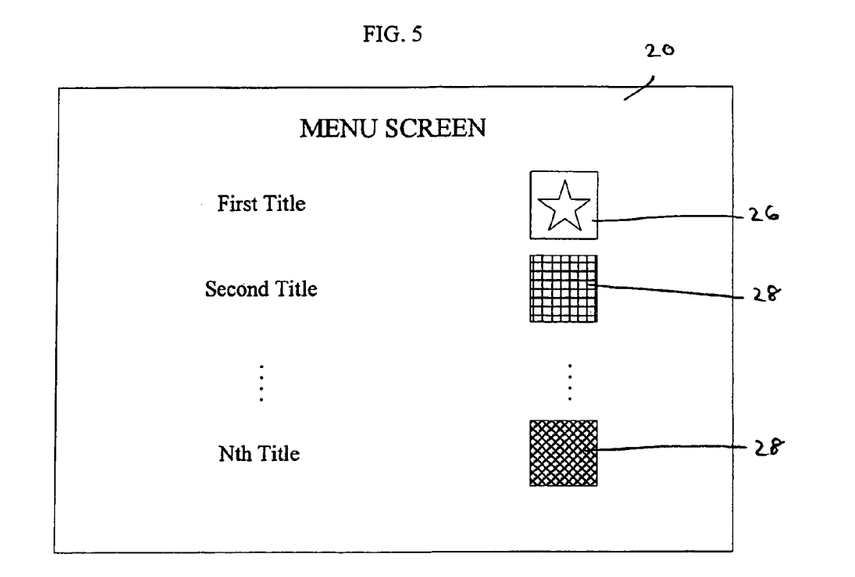
FIG. 5 is an elevational view of the DVD-menu screen of FIG. 4 with one of the mask layers removed.
Figure 6:
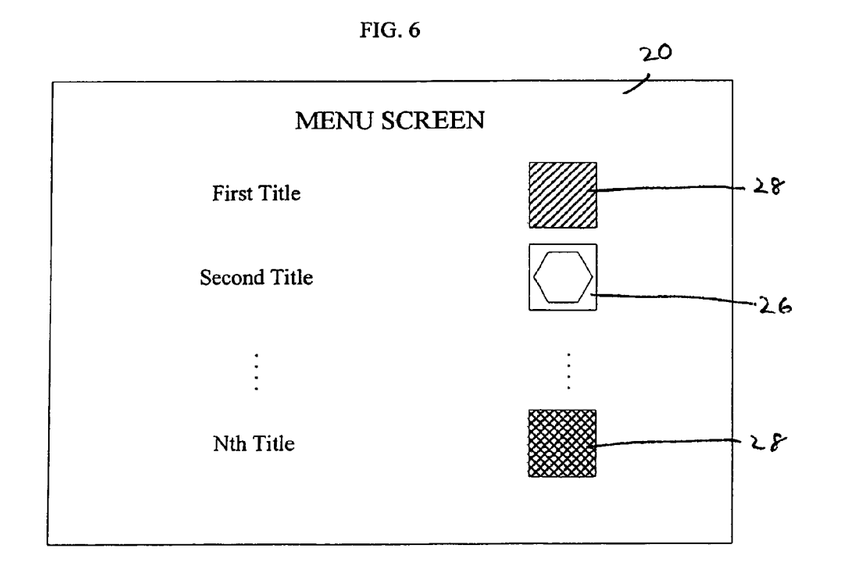
FIG. 6 is an elevational view of the DVD-menu screen of FIG. 4 with one of the mask layers removed.

Using an interface device (not shown), e.g., a mouse or arrow keys included on the DVD player's remote control, the user can move between, highlight, and/or select one of the sub-stream images 26 by selecting a mask image 28. Referring additionally to FIGS. 5 and 6, when a specific mask image is selected, the video sub-stream image underlying that mask image is unmasked, thus, revealing the sub-stream image playing in the display layer 14. This gives the illusion that there is more than one sub-stream video image playing simultaneously in the picture-mask layer 16, which is impossible under the current DVD specifications. In reality, there is only one video image 20 in the display layer, and one or more eight-bit data streams that define mask images in the picture-mask layer.

Simulated "Activating" Selection Among Video Sub-Streams

As shown in FIGS. 5 and 6, the illusion that the user is selecting among thumbnail representations of video-image sub-streams 26 that animate in response to user selection can be enhanced by allowing only one of the simulated thumbnail sub-streams to be visible to the user at a time. This is achieved by using mask image sub-pictures 28 in the picture-mask layer 16 to cover all but one of the image sub-streams at any given time. The image sub-streams are covered and uncovered as the user selects among the mask images.

Simulated Multi-Stream Branching Video

Figure 7:
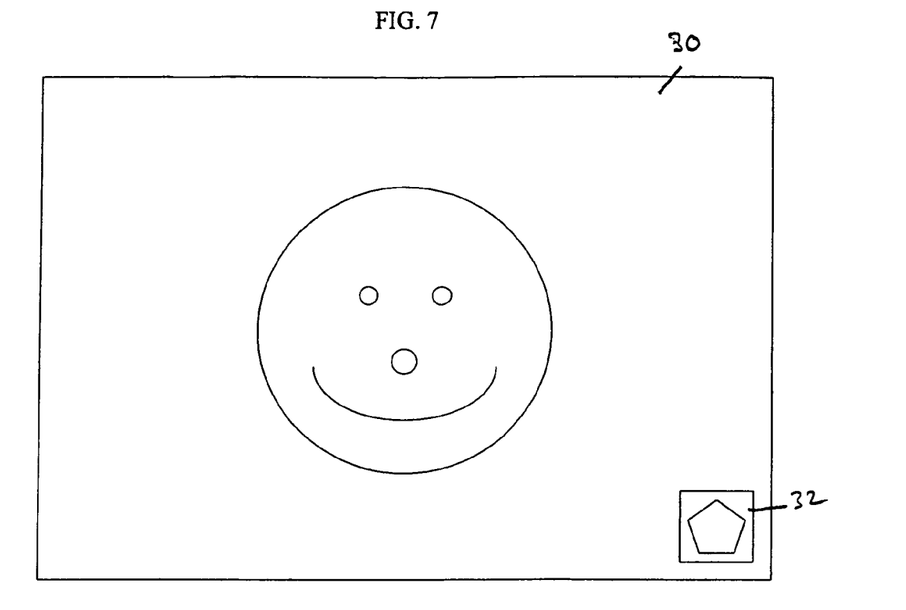
FIG. 7 is an elevational view of a moving, DVD-image stream that includes a sub-stream image in the display layer.
Figure 8:
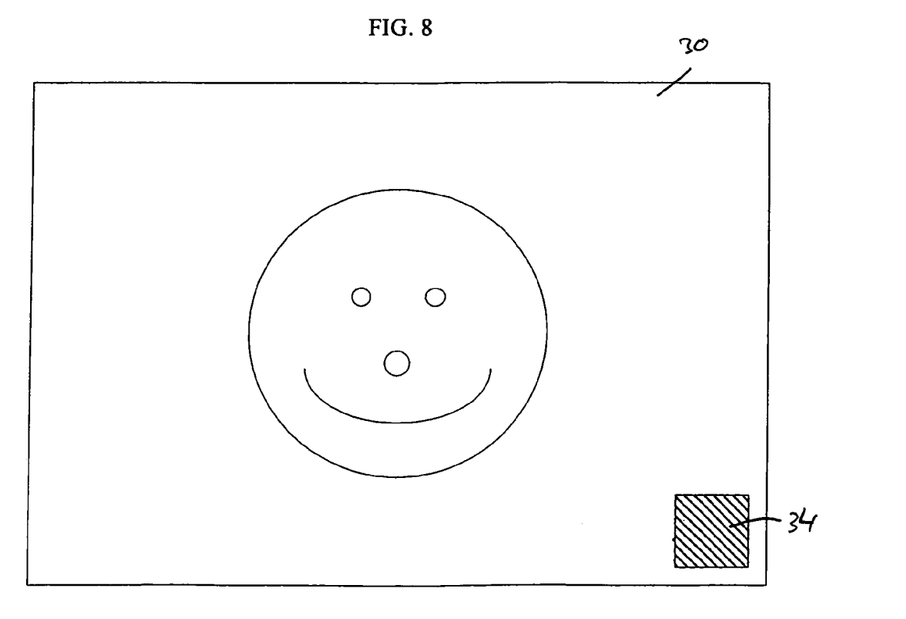
FIG. 8 is an elevational view of a moving, DVD-image stream that includes a sub-picture in the picture-mask layer that covers the sub-stream image of FIG. 7.

Referring additionally to FIG. 7, in another embodiment, a moving, DVD-video stream 30 displays what appear to be a selectable thumbnail representation 32 of another video stream at various points during the display of the video stream, not just in the menu screen 20, to provide the user with the option of "jumping" or "branching" to different video streams. Again, this is an illusion achieved by displaying what appears to be smaller, sub-stream, video images in the overall video stream itself. In fact, the sub-stream images are included in the single video stream that is included in the display layer 14. Referring additionally to FIG. 8, sub-pictures 34 in the picture-mask layer 16 can be used to highlight the sub-stream images, or cover the sub-stream images when they are not to be displayed to the user.

Figure 9:
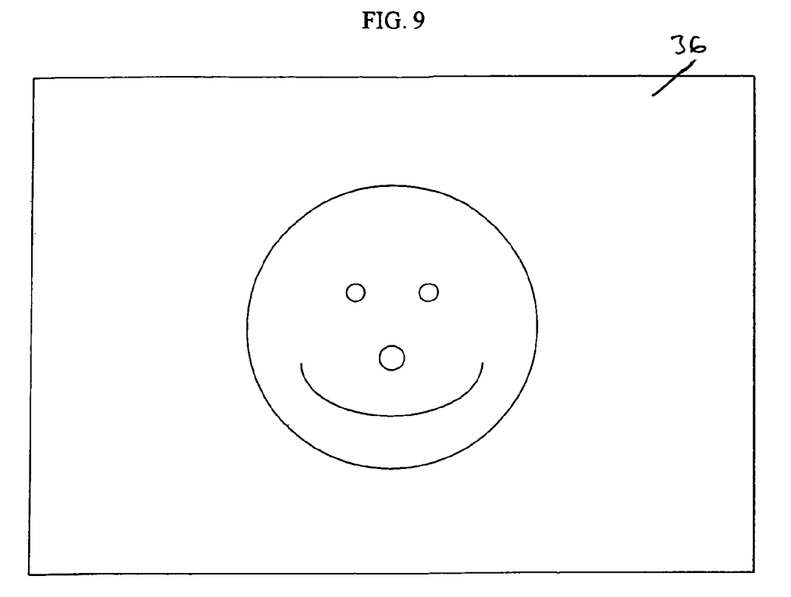
FIG. 9 is an elevational view of a moving, DVD-image stream without a sub-stream image.

Selection Between Normal Video Image and Video Image with Thumbnail Representations In another embodiment, the user can choose between watching the video stream 30 with thumbnail representations 32 of sub-stream video images (see FIG. 7), or the video stream 36 without the thumbnail representations (see FIG. 9). When the user chooses the video stream without thumbnail images, the user sees the normal, unaltered video stream. When the user chooses the video stream with thumbnail representations, the user either sees an entirely different video stream that incorporates the simulated thumbnail representations, or the user sees the normal video stream with specific subsections of the video stream substituted with alternate video streams that are used to simulate the thumbnail representations.

Subtitles/Captioning

As previously mentioned, one limitation associated with the simulated multi-stream branching video described above is the difficulty of concurrently using subtitles, or captions, while presenting the above simulated thumbnail video images. This difficulty comes from the fact that, according to the DVD specification, only one sub-picture stream, included in the picture-mask layer 16, can be displayed simultaneously with the video stream 30, included in the display layer 14. Accordingly, this limitation prevents the simultaneous and separate display of both the video stream and two eight-bit mask layers, one eight-bit mask layer for the mask image(s) 32 and the other eight-bit mask layer for the subtitle 38 (see FIG. 10). This means that the sub-picture stream in the picture-mask layer must either show both subtitles and the video sub-stream(s), i.e., the sub-picture stream includes both subtitles and the video sub-stream(s), the sub-picture stream includes only the subtitles and does not include the video sub-stream(s), or the sub-picture stream includes only the video sub-stream(s) and does not include subtitles at all. Thus, there is no mode of operation that allows the subtitles to be turned ON or OFF independent from the appearance of the video sub-stream(s).

Figure 10:
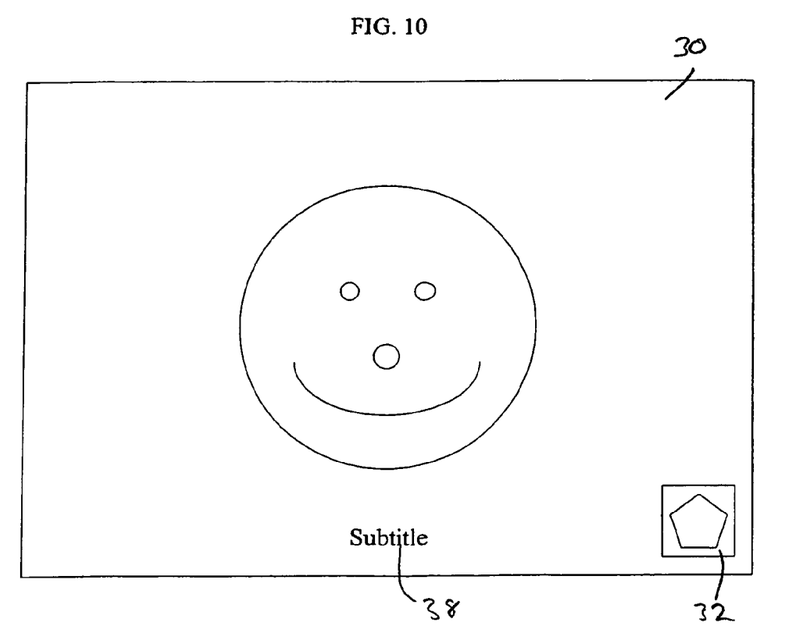
FIG. 10 is an elevational view of a moving, DVD-image stream that includes a sub-stream image in the display layer and a subtitle.

For example, referring to FIG. 7, during the playing of a DVD (not shown), a sub-stream image 32 could appear on the screen that, when selected, using a mouse or the DVD player's remote control, by the user, would stop the DVD image. The user would then view a supplemental feature (not shown) relating to what the user was watching when the sub-stream image was selected. When the supplemental feature is completed, the user then is returned to where the user left off in the DVD image 30. This uses a feature in the DVD specification called "non-seamless branching," and the sub-stream image appears on the screen courtesy of an eight-bit layer in the picture-mask layer 16. Referring additionally to FIG. 10, the problem is that this feature cannot be used with two or more sub-stream images, e.g., a sub-stream image 32 and a subtitle 38, or caption.

Figure 11:
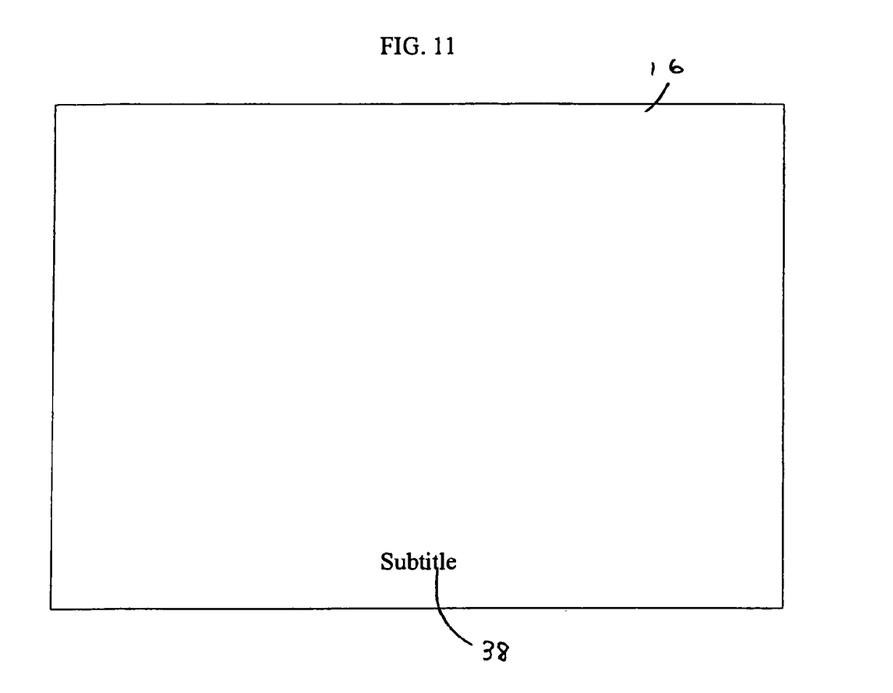
FIG. 11 is an elevational view of a picture-mask layer that includes a subtitle, and is configured to overlay a display layer.

Embodiments of the present invention work around the above limitation by using what is referred to as "seamless branching." In these embodiments, the DVD (not shown) includes two versions of the portion of the video image 30 in which the sub-stream image 32, or similar feature, e.g., subtitle 38, is to appear. One version of the video image just includes the video image without the sub-stream image, as shown in FIG. 9. Referring additionally to FIG. 7, the second version includes the video image and the sub-stream image as part of the video image, i.e., the sub-stream image is part of the video stream. So, although the sub-stream image appears on the screen as if it is an eight-bit mask image included in the picture-mask layer 16, the apparent sub-stream image is actually part of the video stream included in the display layer 14. So, when the user selects the version of the video image that includes the apparent sub-stream image, the user is selecting another version of the DVD image, and not the same video image with an added eight-bit mask layer for the sub-stream image, e.g., a subtitle. Referring additionally to FIG. 11, this embodiment allows for the addition of subtitles that are included in the picture-mask layer, separate from the addition of another sub-stream image in the display layer.

Branching Video with Subtitles Using Multiple Sub-Picture Streams

In one embodiment, the above limitation regarding the addition of subtitles 38 to a DVD image 36 is overcome by the user being allowed to switch between two different eight-bit sub-picture streams 26 and 38 for a single video stream. In this embodiment, one eight-bit sub-picture stream includes only simulated video sub-stream selection highlights 32 (see FIG. 7), the other sub-picture stream has simulated video sub-stream selection highlights and subtitles 38 (see FIG. 10). When the user toggles between turning the subtitles ON or OFF, the DVD (not shown) switches between the two different sub-picture streams.

Branching Video with Subtitles Using Button Highlight Management

Figure 12:
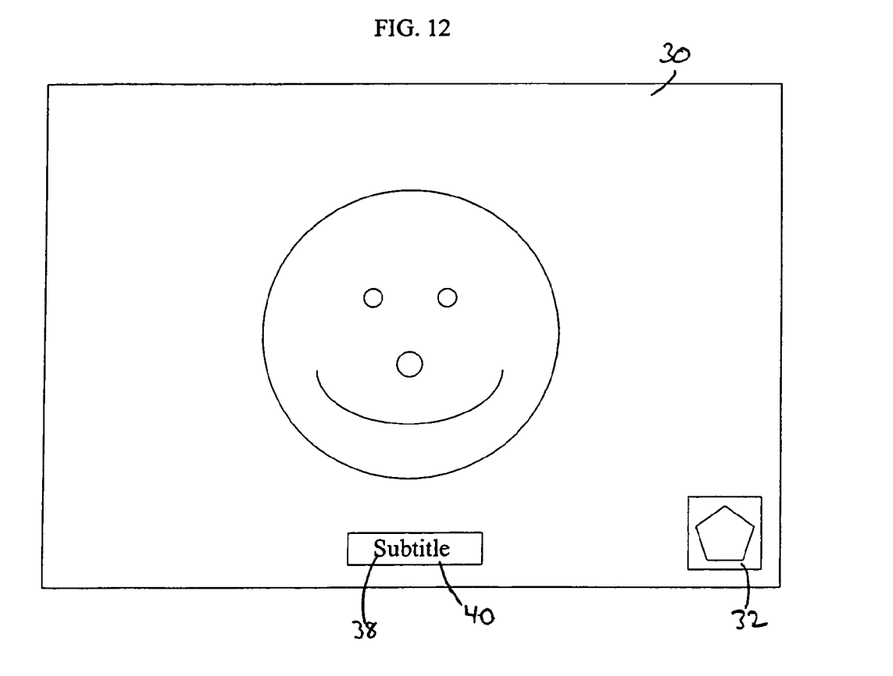
FIG. 12 is an elevational view of a moving, DVD-image stream that includes a sub-stream image, and a subtitle that is incorporated into a button.

Referring additionally to FIG. 12, in another embodiment, the above limitation regarding the addition of subtitles 38 to a DVD image 30, 36 is overcome by selecting among multiple overlapping buttons 40 (one shown) in a single sub-picture stream. The DVD specifications provide for the display of buttons in the picture-mask layer 16. In this embodiment, the subtitles are themselves buttons that when unselected are specified to be completely transparent. The button subtitles are only made visible when the subtitles are turned ON. When so selected, the pixels comprising the subtitles are changed from a color bit corresponding to "transparent" to a color bit corresponding to a visible color, such as white. This embodiment allows for the concurrent display of a simulated video sub-stream(s) 32 in the display layer 14 and button subtitles while retaining the ability to turn the subtitles ON and OFF by the user.

Advantageously, the present invention differs from the prior art in that the user views a video image 20, 30 that includes a selectable, non-static, sub-stream video image 26, 32. These sub-stream video images can be incorporated into menu screens 20 or into other moving-video images 30. Thus, the present invention advantageously enables the simulation of multiple, concurrent video streams in support of DVD-video user interfaces, for example, the title menu and user-initiated video-branching, while remaining compliant with the DVD-video specifications.

The foregoing detailed description of the present invention is provided for purposes of illustration, and it is not intended to be exhaustive or to limit the invention to the particular embodiments disclosed. The embodiments can provide different capabilities and benefits, depending on the configuration used to implement the key features of the invention. Accordingly, the scope of the invention is defined only by the following claims.

What is claimed is:

1. A system comprising:
 a video player;
 a memory operably associated with the video player in which DVD-Video data is encoded, wherein the DVD-Video data, when played by the video player, causes the video player to simulate output of multiple simultaneous separately selectable video streams using a single video display layer, a single picture-mask layer, and a single highlight layer defined by the DVD-Video data, by (i) decoding the display layer to provide a first video stream including video data for displaying a representation of a video stream image and a representation of a sub-stream image on a display device, each representation simulating a respective one of separate moving image video streams for simultaneous display in distinct screen areas of the display device, and by (ii) selectively masking and unmasking at least the representation of the sub-stream image as defined by the picture mask layer, in response to input received by the video player from a user input device, while revealing the representation of the video stream image.

2. The system of claim 1, wherein the DVD-Video data, when played by the video player, further causes the video player to decode the display layer to provide a second video stream corresponding to the sub-stream image in replacement of the first video stream, in response to receiving user input indicating selection of the sub-stream image at a time when the representation of the sub-stream image is unmasked.

3. The system of claim 2, wherein the DVD-Video data, when played by the video player, further causes the video player to decode the second video stream from the display layer comprising a representation of the video stream image with a subtitle, thereby enabling selective display of subtitles that are not included in the picture-mask layer.

4. The system of claim 1, wherein the DVD-Video data, when played by the video player, further causes the video player to enable selective display of a subtitle by displaying, in response to input from a user input device, a selected one of multiple sub-picture streams in the picture-mask layer, wherein a first one of the sub-picture streams includes the subtitle and a mask image, and a second one of the sub-picture streams includes the mask image without the subtitle.

5. The system of claim 1, wherein the DVD-Video data, when played by the video player, further causes the video player to enable selective display of subtitles by toggling colors assigned to subtitles on multiple overlapping buttons defined by the picture-mask layer between a transparent color and a visible color, in response to input from a user input device.

6. The system of claim 1, wherein the DVD-Video data, when played by the video player, further causes the video player to provide the first video stream including video data for displaying the representation of the sub-stream image at a thumbnail size.

7. The system of claim 6, wherein the DVD-Video data, when played by the video player, further causes the video player to provide the first video stream including video data for displaying the representation of a video stream image at a size substantially filling a screen of the display device around the representation of the sub-stream image.

8. The system of claim 6, wherein the DVD-Video data, when played by the video player, further causes the video player to provide the first video stream including video data for displaying the representation of a video stream image at a thumbnail size.

9. The system of claim 1, wherein the DVD-Video data, when played by the video player, further causes the video player to provide output for visibly indicating selection of the representation of the sub-stream image in response to input from the user input device, according to information defined by the highlight layer.

10. The system of claim 1, wherein the DVD-Video data, when played by the video player, further causes the video player to output a background image defined by the picture-mask layer, distinct from any mask image used for masking the representation of a sub-stream image.

11. The system of claim 1, wherein the DVD-Video data, when played by the video player, further causes the video player to output more than one background image defined by the picture-mask layer configured for sequential display, and that are each distinct from any mask image used for masking the representation of a sub-stream image.

12. A method comprising:
simulating output of multiple simultaneous separately selectable video streams using a video player to provide output of a single video display layer, a single picture-mask layer, and a single highlight layer from DVD-Video data fixed in a tangible recording medium, by (i) decoding the display layer from the tangible recording medium to provide a first video stream including video data for displaying a representation of a video stream image and a representation of a sub-stream image on a display device, each representation simulating a respective one of separate moving image video streams simultaneously displayed in distinct screen areas of the display device, and (ii) selectively masking and unmasking at least the representation of the sub-stream image as determined by the picture mask layer, in response to input received by the video player from a user input device, while revealing the representation of the video stream image.

13. The method of claim 12, wherein the video player further decodes the display layer to provide a second video stream from the medium corresponding to the sub-stream image and replacing the first video stream, in response to receiving user input indicating selection of the sub-stream image at a time when the representation of the sub-stream image is unmasked.

14. The method according to claim 13, wherein the video player decodes the second video stream from the display layer comprising a representation of the video stream image with a subtitle, thereby enabling selective display of subtitles that are not included in the picture-mask layer.

15. The method according to claim 14, further comprising enabling selective display of a subtitle by displaying, in response to input from a user input device, a selected one of multiple eight-bit sub-picture streams in the picture-mask layer, wherein a first one of the sub-picture streams includes the subtitle and a mask image, and a second one of the sub-picture streams includes the mask image without the subtitle.

16. The method according to claim 12, further comprising enabling selective display of subtitles by toggling colors assigned to subtitles on multiple overlapping buttons defined by the picture-mask layer between a transparent color and a visible color, in response to input from a user input device.

17. The method according to claim 12, wherein the video player provides the first video stream including video data for displaying the representation of the sub-stream image at a thumbnail size.

18. The method according to claim 17, wherein the video player provides the first video stream including video data for displaying the representation of a video stream image at a size substantially filling a screen of the display device around the representation of the sub-stream image.

19. The method according to claim 17, wherein the video player provides the first video stream including video data for displaying the representation of a video stream image at a thumbnail size.

20. The method according to claim 12, wherein the video player provides output for visibly indicating selection of the representation of the sub-stream image in response to input from the user input device, as determined by the highlight layer.

* * * * *